United States Patent
Bang

(10) Patent No.: US 6,722,162 B2
(45) Date of Patent: Apr. 20, 2004

(54) AUTOMATIC QUARTZ TUBE LEVELLING DEVICE IN OPTICAL FIBER PREFORM MANUFACTURING SYSTEM USING MODIFIED CHEMICAL VAPOR DEPOSITION TECHNIQUE

(75) Inventor: Sung-Wook Bang, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 10/055,843

(22) Filed: Jan. 23, 2002

(65) Prior Publication Data

US 2003/0005729 A1 Jan. 9, 2003

(30) Foreign Application Priority Data

Jun. 23, 2001 (KR) ........................................ 2001-36000

(51) Int. Cl.[7] ............................................... C03B 37/07
(52) U.S. Cl. ........................................................ 65/485
(58) Field of Search .............................. 65/484, 485, 3, 65/77, 421, 529, 331; 73/1.75, 1.79; 75/1.81; 33/227, 286

(56) References Cited

U.S. PATENT DOCUMENTS

| | | | | |
|---|---|---|---|---|
| 2,740,298 A | * | 4/1956 | Swearingen | 73/478 |
| 3,713,746 A | * | 1/1973 | Luthy | 408/8 |
| 3,803,720 A | * | 4/1974 | Helava | 33/228 |
| 3,805,624 A | * | 4/1974 | Martin | 73/462 |
| 3,897,837 A | * | 8/1975 | Gengo | 33/227 |
| 4,294,601 A | * | 10/1981 | Dabby et al. | 65/378 |
| 4,321,072 A | * | 3/1982 | Dubos et al. | 65/382 |
| 4,419,116 A | * | 12/1983 | Nakahara et al. | 65/378 |
| 4,545,247 A | * | 10/1985 | Wilson et al. | 73/473 |
| 4,941,352 A | * | 7/1990 | Fietzke | 73/461 |
| 5,183,490 A | * | 2/1993 | Mikami et al. | 65/144 |
| 5,942,019 A | * | 8/1999 | Saito et al. | 65/382 |
| 6,588,115 B1 | * | 7/2003 | Dong | 33/227 |
| 6,618,120 B2 | * | 9/2003 | Ueta | 355/72 |
| 2002/0053224 A1 | * | 5/2002 | Charlton et al. | 65/382 |

* cited by examiner

Primary Examiner—Steven P. Griffin
Assistant Examiner—Carlos Lopez
(74) Attorney, Agent, or Firm—Cha & Reiter, L.L.C.

(57) ABSTRACT

An automatic quartz-tube leveling device for automatically measuring the leveling state of an optical-fiber preform on an on-line basis using a modified-chemical-vapor deposition (MCVD) technique is disclosed. A quartz tube is disposed in a horizontal supporting element such as a lathe. A measuring device is provided with a light-emitting device and a light-receiving device, interposing the quartz tube, for measuring an upper eccentric value and a lower eccentric value along a length of the quartz tube. A controller receives the measured upper and lower eccentric values from the measuring device, compares the measured values with predetermined reference values, and specifies a necessary leveling span of the quartz tube. A transfer device then moves to a necessary leveling span of the quartz tube to carry out leveling of the quartz tube, under control of the controller.

6 Claims, 5 Drawing Sheets

AUTOMATIC QUARTZ TUBE LEVELLING DEVICE IN OPTICAL FIBER PREFORM MANUFACTURING SYSTEM USING MODIFIED CHEMICAL VAPOR DEPOSITION TECHNIQUE

CLAIM OF PRIORITY

The present application makes reference to and claims all benefits accruing under 35 U.S.C. §119 from an application entitled, "Automatic Quartz Tube Leveling Device In Optical Fiber Preform Manufacturing System Using Modified Chemical Vapor Deposition Technique," filed earlier in the Korean Industrial Property Office on Jun. 23, 2001 and thereby duly assigned Serial No. 36000/2001.

BACKGROUND OF THE INVENTION

1. Field of the Invention

The present invention relates to a device for manufacturing an optical-fiber preform using a modified-chemical-vapor-deposition (MCVD) technique and, in particular, to a device for automatically leveling a silica tube while being subject to a traversing oxy-hydrogen heating.

2. Description of the Related Art

In general, the process of manufacturing an optical fiber is divided into two steps: the process of fabricating an optical-fiber perform, and the extrusion process of extruding a strand of optical fiber from the optical-fiber preform. Fabricating the core/inner cladding is well known in the art and can be performed in a variety of ways, such as the modified-chemical-vapor deposition (MCVD), which involves passing a high-purity gas through the interior of a silica tube while heating the outside of the tube wall.

FIG. 1 illustrates the conventional MCVD technique that is used to fabricate an optical preform. Two ends of the quartz tube T are fastened by a pair of chucks 12, each disposed in the opposite ends on a horizontal lathe 10, or the like. The quartz tube T is heated with a traversing burner B in the direction of an arrow A3, while being rotated in the direction of an arrow A1 of the A-axis. At the same time, oxygen gas with SiCl and other chemical substances is blown in the direction of an arrow A2 into the quartz tube T to form soot in the inner surface of the quartz tube T. In the heated area of the tube, a gas phase reaction occurs which deposits particles on the tube wall. The deposit is sintered as the heat passes over it. Once deposition is complete, the body is heated to collapse the tube and obtain a solid, consolidated preform in which the tube constitutes the outer portion of the inner cladding material.

During the process of manufacturing an optical-fiber preform as described above, it is necessary to conduct a routine check to ensure that the leveling state of the optical-fiber perform is substantially horizontal. This leveling process is often performed by a skilled operator to manually adjust the leveling of the optical-fiber perform to a desired point. To this end, the operator uses a leveling bar to adjust the horizontal orientation of the optical fiber preform using a polytetrafluoroethylene pad, wherein polytetrafluoroethylene is sold under the trademark teflon™. As such, this type of leveling operation is susceptible to many human errors and requires a full-time person only dedicated to perform the leveling process. Accordingly, the leveling process currently being implemented is uneconomical and unreliable.

SUMMARY OF THE INVENTION

The present invention overcomes the above-described problems and provides additional advantages, by providing an automatic quartz-tube leveling device that is capable of automatically measuring the leveling state of an optical-fiber preform on a continuous basis, without requiring any additional operators to monitor the leveling state.

According to one aspect of the invention, an automatic quartz-tube leveling device for manufacturing an optical-fiber preform using a modified-chemical-vapor-deposition (MCVD) technique includes: a quartz tube disposed in a horizontal supporting element or its equivalent in order to manufacture the optical-fiber preform; a measuring device having at least one light-emitting device and at least one light-receiving device, the light-emitting device being disposed apart from the light-receiving device in an opposite position over the quartz tube, and for measuring an upper eccentric value and a lower eccentric value of an outer diameter along the length of the quartz tube; a controller for receiving the measured upper and lower eccentric values from the measuring device, for comparing the measured values with predetermined reference values to determine an eccentric difference amount, and for specifying a necessary leveling span to level the quartz tube to a desired point; and, a transfer device for adjusting the level of the quartz tube to the desired point based on the eccentric difference amount.

According to another aspect of the invention, a method for leveling a quartz tube when manufacturing an optical-fiber preform includes the steps of: providing the quartz tube in a substantially horizontal orientation; providing a traversing measuring device along the lateral direction of the quartz tube; measuring an upper eccentric value and a lower eccentric value with respect to an outer diameter of the quartz tube; comparing the measured upper and lower eccentric values with predetermined upper and lower reference values, respectively, to obtain an eccentric difference amount; and, simultaneously adjusting the leveling of the quartz tube according to the eccentric difference amount.

Preferably, the measuring device of the automatic quartz-tube leveling device includes a laser-scanning device.

Preferably, the measuring device includes a scanning area capable of radiation to an area larger than the longitudinal diameter of the quartz tube so as to measure the upper and lower eccentric values of the quartz tube. The scanning area is disposed directly facing the quartz tube.

Preferably, the transfer device further includes a control motor, a ball screw coupled with the control motor along a length of the quartz tube by using a coupler, a ball screw block coupled with the ball screw for movement along the length of the quartz tube according to revolutions of the control motor, and a leveling pad connectable to the ball screw block for carrying out a leveling operation for the quartz tube subsequently to movement to an instructed leveling span of the quartz tube by revolution of the ball screw.

Preferably, between the ball screw block and the leveling pad are further provided with a hydraulic or, more preferably, air cylinder and a spring. The spring may be connected between one arm of the hydraulic or air cylinder and the leveling pad.

Preferably, the leveling pad may consist of a polytetrafluoroethylene pad, wherein polytetrafluoroethylene is sold under the trademark teflon™.

BRIEF DESCRIPTION OF THE DRAWING

The foregoing and other features and advantages of the invention will be apparent from the following more detailed description of preferred embodiments as illustrated in the accompanying drawings, wherein same reference characters refer to the same parts or components throughout the various views. The drawings are not necessarily to scale, but the emphasis instead is placed upon illustrating the principles of the invention, wherein.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices and methods are preferably omitted so as not to obscure the description of the present invention with unnecessary detail.

In order to facilitate an understanding of this invention, it is noted that an X-axis direction represents a longitudinal direction of a quartz tube T, a Y-axis direction represents an up/down direction of the quartz tube, and a Z-axis direction represents a radiation direction of a measuring device according to the present invention.

Figure 1:
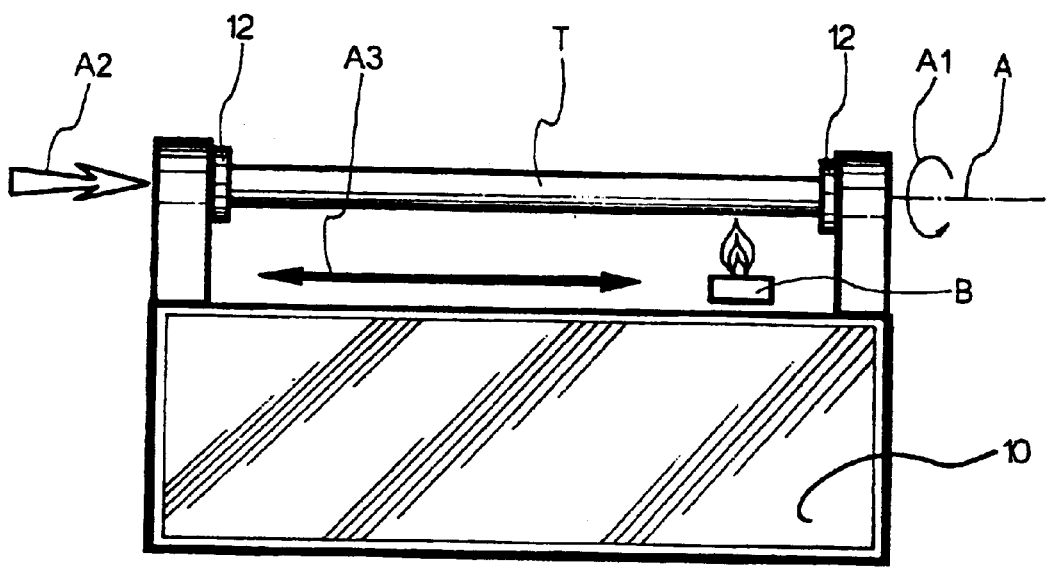
FIG. 1 illustrates a schematic view of arrangement of the conventional device for manufacturing an optical-fiber preform using the MCVD.
Figure 2:
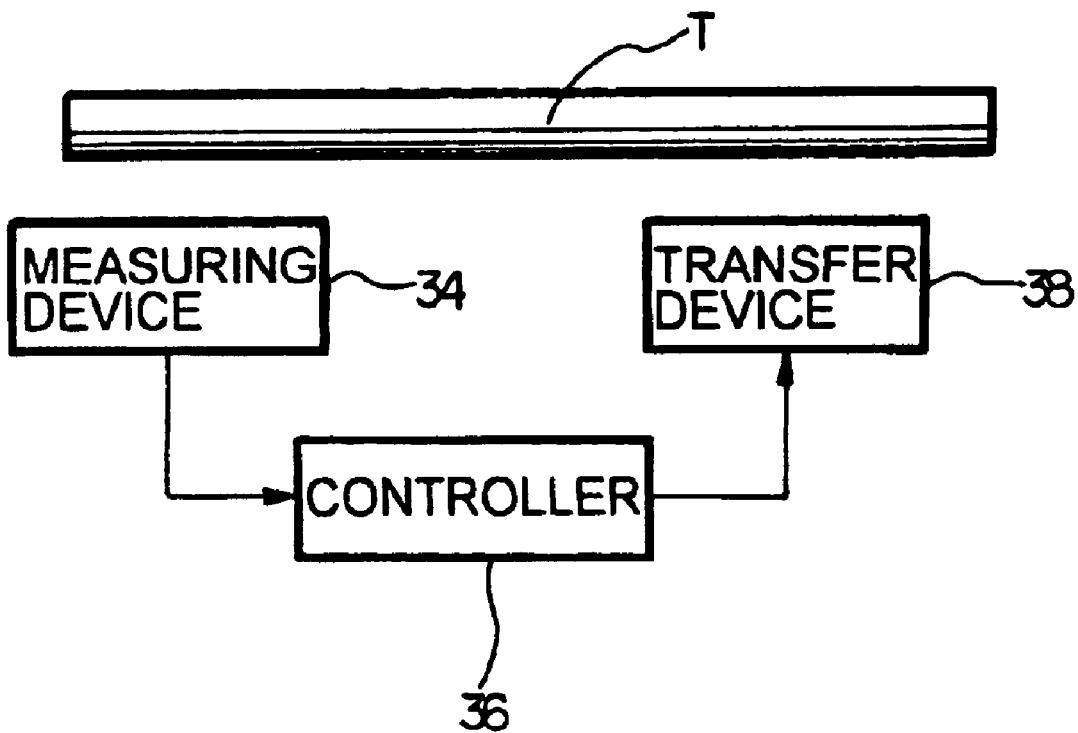
FIG. 2 illustrates a block diagram for an automatic quartz-tube leveling device according to a preferred embodiment of the present invention.
Figure 3:
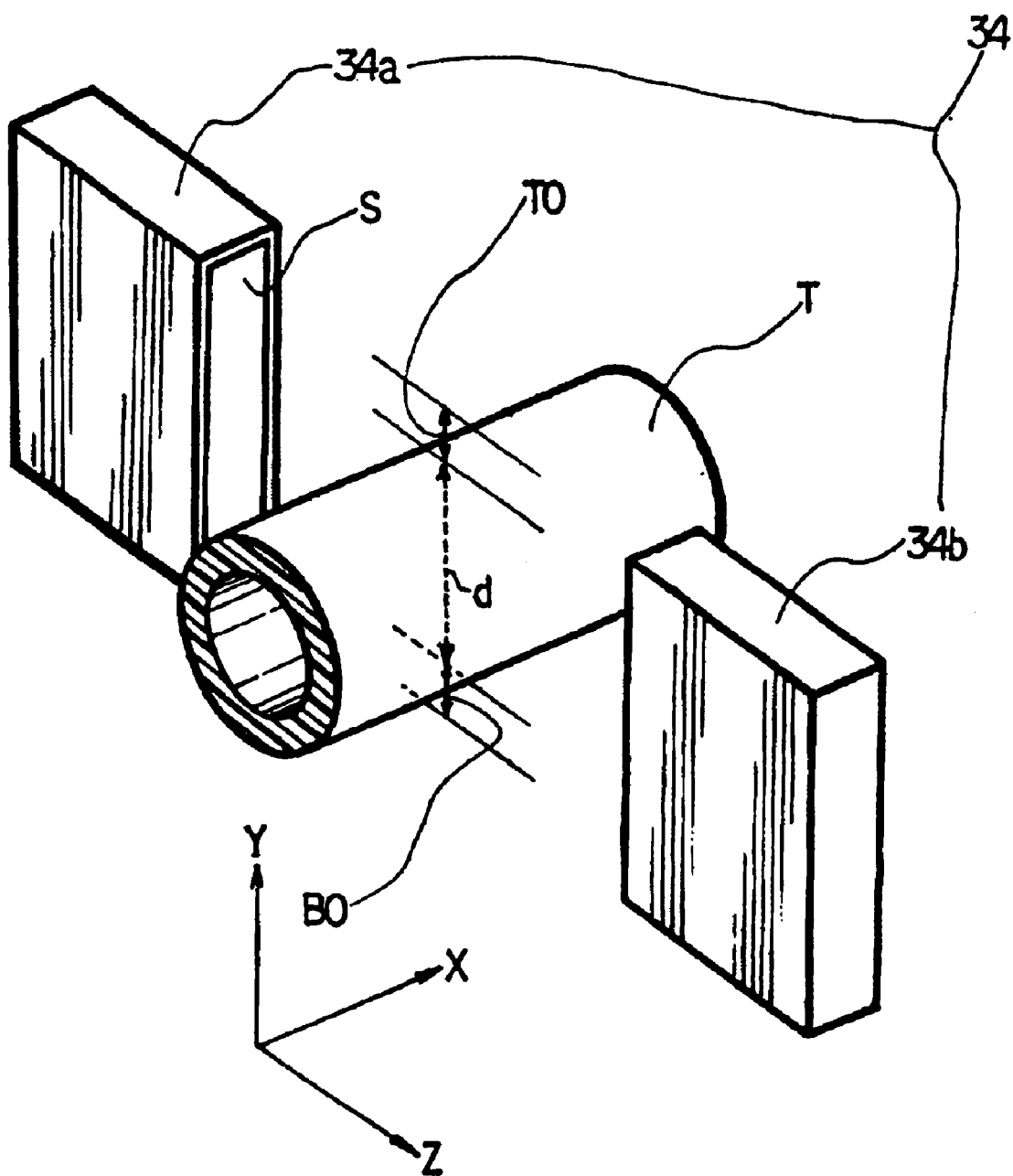
FIG. 3 illustrates a schematic diagram depicting the arrangement of an automatic quartz-tube leveling device in association with a quartz tube in accordance with a preferred embodiment of the present invention.
Figure 4:
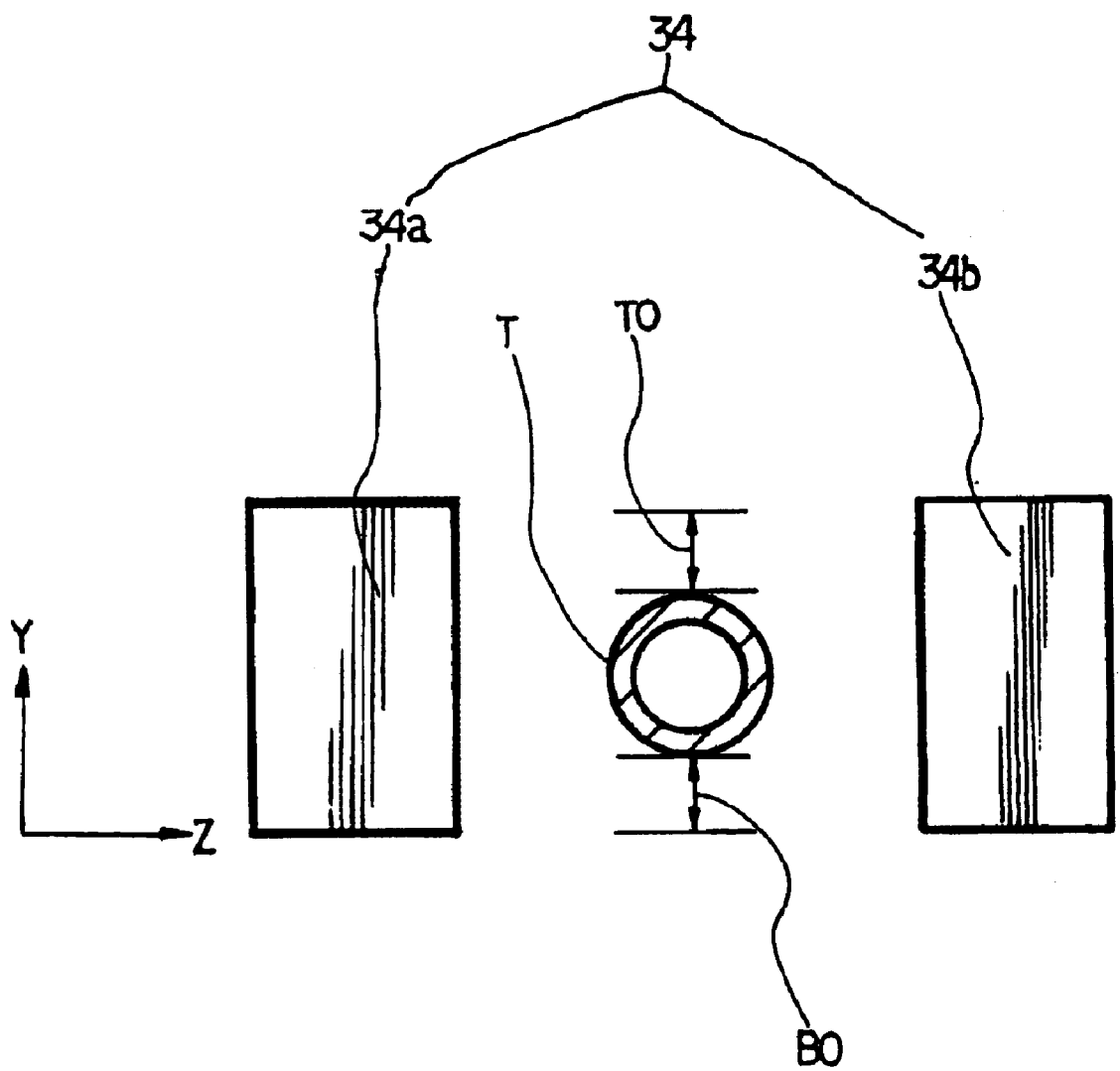
FIG. 4 illustrates a front view of FIG. 3.

As shown in FIGS. 2 to 4, the automatic quartz-tube leveling device according to a preferred embodiment of the present invention is configured to provide a precise measurement on the leveling state of a quartz tube T and compare the measured level state with a predetermined reference value. If there is a difference, the leveling state of the quartz tube T can be adjusted in real time with a transferring device (explained later with reference to FIG. 5).

Referring back to FIG. 2, the automatic quartz-tube leveling device according to a preferred embodiment of the present invention includes a measuring device 34 for measuring an upper eccentric value T0 and a lower eccentric value B0 which extend from the outer diameter of the tube to an upward and downward direction, respectively, a controller 36 for receiving the respective measured values from the measuring device 34 and for comparing the measured values with the predetermined reference value to generate an eccentric difference value, and a transfer device 38 for performing the leveling of the quartz tube T in response to an instruction of the controller 36. The transfer device 38 includes a control motor and a "Teflon™" pad coupled to the control motor for effectively carrying out the leveling of the quartz tube T. A detailed description of the transfer device 38 will be explained later.

FIGS. 3 and 4 explain the measuring device 34 for measuring on an on-line basis the leveling state of the quartz tube T on an on-line basis. The measuring device 34 includes a set of a light-emitting device 34a and a light-receiving device 34b, between which the quartz tube T is disposed. The light-emitting device 34a and the light-receiving device 34b travel along the lengthwise direction (x-direction) of the quartz tube T to measure its leveling state. In particular, the measuring device 34 is operative to measure the leveling state of the quartz tube, i.e., the upper eccentric value T0 and the lower eccentric value B0 in relation to the quartz tube T.

In the embodiment, a laser-scanning unit may be used as the measuring device 37 in accordance with the techniques of the present invention. As such, the scanning area of the light-emitting device 34a corresponds to a laser emitting area, and the emitted laser beam is incident upon the light-receiving device 34b. The measuring device 34 measures the leveling state of the set quartz tube T and then provides the controller 36 with the measured data for a comparison with a predetermined reference data.

Note that when measuring the outer diameter of the quartz tube T by the measuring device 34, the scanning area (S) needs to be larger than the outer diameter of the quartz tube T. The light-emitting device 34a of the measuring device 34 radiates a laser beam to the quartz tube T so that the radiated laser beam passes through the quartz tube T to be incident upon the light-receiving device 34b. Accordingly, the longitudinal length of the scanning area (laser-emitting area 34a) of the measuring device 34 must be larger than the outer diameter of the quartz tube (d) so as to enable measurement of the upper and lower eccentric values T0 and B0 in a precise manner. Here, the linear characteristics of the laser light beam makes it possible to precisely measure the leveling state of the quartz tube T, i.e., the upper and lower eccentric values. As such, a light beam passes from 34a to 34b over the tube, including upper T0 and lower B0 boundaries, such that the light beam in the path of the tube is deflected and only the non-deflected light beam is detected by 34b. Thus, as the 34a and 34b move in the X-direction, 34b detects a change in the upper T0 and the lower B0 from a previous recording, and compares them to the respective predetermined values, for example, $T_{thresh}$ and $B_{thresh}$, to generate the respective difference amount. Then, the leveling is performed according to the respective difference amounts to level the tube to a substantially horizontal orientation.

As described in the preceding paragraphs, the measuring device 34 can measure not only the outer diameter of the quartz tube but also changes of the upper (or top) limit and the lower (or bottom) limit of the quartz tube T. The upper eccentric value measured by the measuring device 34 may be indicated in the unit of T0(+) or T0(−), while the lower eccentric value measured by the measuring device 34 may be indicated in the unit of B0(+) or B0(−).

In operation, the measurement of the upper eccentric value T0 and the lower eccentric value B0 of the quartz tube are executed by the traversing measuring device 34, then the measured upper and lower eccentric values are provided to the controller 36. Thereafter, the controller 36 compares the measured upper and lower eccentric values with the predetermined reference values, respectively, to determine the amount of changes in the respective values. Based on the difference, the controller 36 determines the required span of the quartz tube T for leveling. To this end, the controller 36 sends a control signal indicative of the required leveling span of the quartz tube T to the transfer device 38, which then operates to move the quartz tube T according to the amount of leveling span determined by the controller 36.

Figure 5:
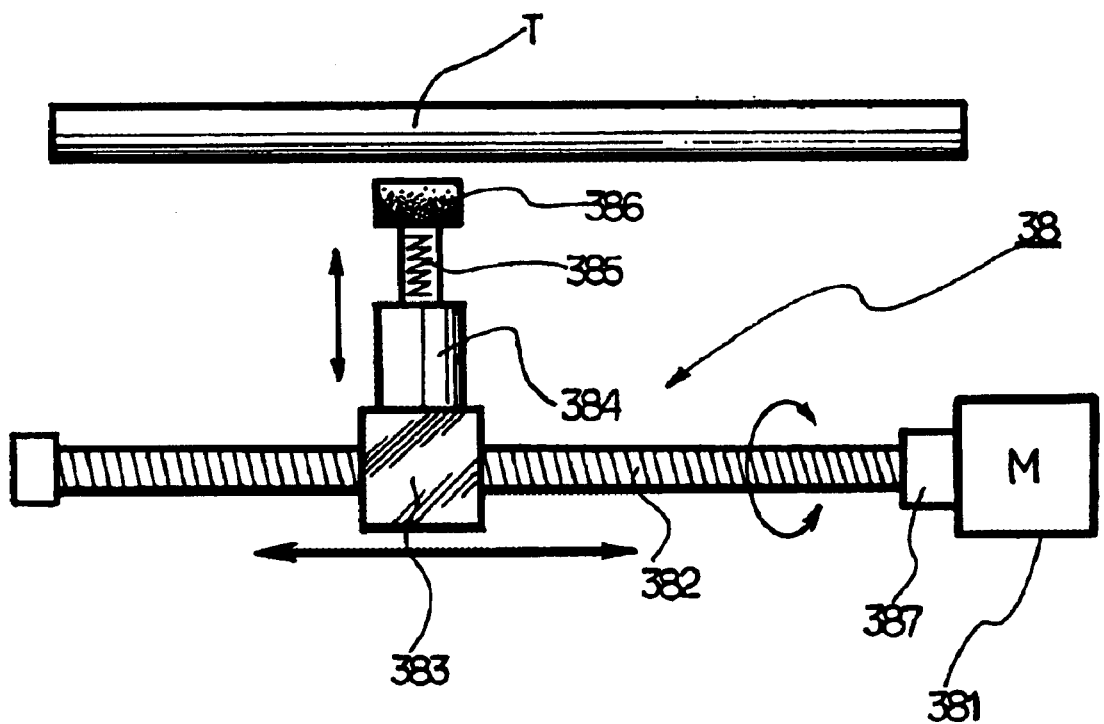
FIG. 5 illustrates a schematic diagram depicting the arrangement of a transfer device for the automatic quartz-tube leveling device in accordance with a preferred embodiment of the present invention.

Referring to FIG. 5, the transfer device 38 includes a control motor 381 that is controlled by the controller 36, and a "teflon™" pad 386 that is coupled with the motor 381 for effectively carrying out the leveling of the quartz tube T. The transfer device 38 further includes a ball screw 382 coupled to the revolution shaft of the motor 381, a ball screw block 383 for movement to the right or left according to revolution of the ball screw, a hydraulic cylinder (preferably, air cylinder) 384 coupled to the ball screw block 383 for providing an up/down movement, and a "teflon™" pad 386 coupled with one end of the hydraulic cylinder 384 via a spring 385 for carrying out the leveling of the quartz tube T. The spring 385 is disposed between one end of the hydraulic cylinder 384 and the "teflon™" pad 386, in order to absorb any unnecessary vibrations during the leveling process of the quartz tube T. The control motor 381 and the ball screw 382 are coupled to each other by means of a coupler 387 for a transmission of driving power.

Under the control of the controller 36, the motor 381 starts to revolve and, as a result, the ball screw 382 revolves to traverse the ball screw block 383 to move to the right or left. After the movement of the ball screw block 383, the hydraulic (or air) cylinder 384 operates to transfer the "teflon™" pad up or down in order to perform the leveling process. The amount of leveling is specified by the controller 36 based on the feedback from the measuring device as occasion demands.

As apparent from the foregoing description, it is appreciated that the automatic quartz-tube leveling device according to the present invention makes it possible to make an automatic measurement on the leveling state of an optical-fiber preform on an on-line basis, without a number of operators required for measuring the leveling state. Furthermore, an automatic quartz-tube leveling device for an optical-fiber preform with high reliability is obtained.

While the preferred embodiments of the present invention have been illustrated and described, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention; instead, it is intended that the present invention include all embodiments falling within the scope of the appended claims.

What is claimed:

1. An automatic quartz-tube leveling device for manufacturing an optical-fiber preform according to a modified-chemical-vapor deposition (MCVD), comprising:
    a quartz tube disposed in a horizontal supporting element;
    a measuring device having at least one light-emitting device and at least one light-receiving device, the light-emitting device spaced apart from the light-receiving device over the quartz tube in an opposite position for measuring an upper eccentric value and a lower eccentric value with respect to an outer diameter of the quartz tube;
    a controller for receiving the measured upper and lower eccentric values from the measuring device, and for comparing the measured values with predetermined reference values, respectively, to determine an eccentric difference value; and,
    a transfer device, coupled to the controller, for adjusting the leveling of the quartz tube according to the eccentric difference value.

2. The device of claim 1, wherein the measuring device comprises a laser-scanning device.

3. The device of claim 1, wherein the measuring device comprises a scanning area that is substantially greater than the diameter of the quartz tube to measure the upper and lower eccentric values of the quartz tube.

4. The device of claim 1, wherein the transfer device further comprises a control motor; a ball screw coupled to a revolution shaft of the control motor; and, a ball screw block for movement to the right or left according to revolution of the ball screw.

5. The device of claim 4, further comprising a hydraulic cylinder coupled to the ball screw block for providing an up/down movement, and a leveling pad coupled with one end of the hydraulic cylinder via a spring for carrying out the leveling of the quartz tube.

6. The device of claim 5, wherein the leveling pad consists of a polytetrafluoroethylene pad.

* * * * *